United States Patent Office 3,474,149
Patented Oct. 21, 1969

3,474,149
PROCESS FOR THE PRODUCTION OF RACEMIC (1S,4S,9R)(1R,4R,9S) - CIS - DECAHYDRONAPH-THALENE-DIOL-(1,4)
Walter Dittmann and Franz Sturzenhofecker, Marl, Germany, assignors to Chemische Werke Huls, Aktiengesellschaft, Marl, Germany, a corporation of Germany
No Drawing. Filed July 28, 1965, Ser. No. 475,563
Claims priority, application Germany, Sept. 21, 1964, C 33,935
Int. Cl. C07c 29/04; C07d 1/08
U.S. Cl. 260—617
4 Claims

ABSTRACT OF THE DISCLOSURE

Process for the production of racemic (1S,4S,9R) (1R,4R,9S) - cis-decahydronaphthalenediol-(1,4) which comprises epoxidizing cis-trans-cyclodecadiene-(1,5) by treatment with an organic peroxy compound at a temperature of from −10 to −60° C. and heating the resulting cyclodiene-monoepoxide with water whereby hydrolysis and rearrangement are effected.

---

The (1S,4S,9R)-cis-decahydronaphthalenediol-(1,4) is represented by the formula

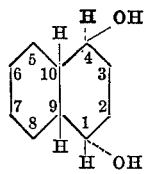

The optically active, dextroratary form having the melting point 164–165° C. was first produced microbiologically in very small amount by P. Baumann and V. Prelog (Helv. Chim. Acta 41, 2362 (1958)). The racemate having the melting point 156.5–157.5° C. was described by W. Hückel and W. Kraus (Chem. Ber. 92, 1158 (1959) and 95, 233 (1962)). The best method of production appeared to be by the hydrogenation of 1,4-dihydroxynaphthalene in the presence of Raney nickel in an autoclave. However the hydrogenation was not stereospecific. In addition to the racemate of the (1S,4S,9R)-cis-decahydronaphthalenediol-(1,4) also the five theoretical stereoisomers of cis- and trans-decahydronaphthalene-1,4-diols were obtained in the form of a very difficultly separable mixture. Gas chromatographic procedure showed that the yield of the desired product was 19% based upon the dihydroxynaphthalene. By prolonged fractional crystallization with heavy loss the isolation of the racemic (1S,4S,9R)-cis-decahydronaphthalenediol-(1,4) was accomplished. H. Feltkamp and W. Kraus (Liebigs Ann. Chem. 651, 10 (1962)) improved the isolation by separating the isomers by counter current separation. Still this improved process for technical operation involves nearly insurmountable difficulties because by the use of e.g. 131 l. of a solvent mixture of ethylacetate, petroleum ether and water in the ratio 2:1:3 only 11 g. (57.4%) of the racemic (1S,4S,9R)-cis-decahydronaphthalenediol-(1,4) contained in the diol mixture was isolated from 51 g. of the diol mixture in 70 hours. The total yield based upon the 1,4-dihydroxynaphthalene was only about 11%. Moreover, the cost for apparatus in the countercurrent separation is relatively high.

It has now been found that the racemic (1S,4S,9R)-cis-decahydronaphthalenediol-(1,4) can be produced surprisingly simply and stereoselectively by epoxidizing cis-trans-cyclodecadiene-(1,5) in known manner to the monoepoxide and heating the cyclodecadiene monoepoxide in an aqueous medium in two stages whereby the racemic (1S,4S,9R) - cis-decahydronaphthalenediol-(1,4) is formed in high yield by transannular reaction.

Transannular reactions are known in the case of cycloaliphatic compounds having 10 carbon atoms. The same is true with 12 carbon atoms (see E. T. Niles and H. R. Snyder, J. Organ. Chem. 26, page 330 (1961)). The hydrolysis of monoepoxidized cyclododecatriene-(1,5,9) does not give any rearrangement product but only the 1,2-diol is formed (see Belgian Patent No. 592,436). Thus the exceedingly smooth course of the hydrolysis of the cyclodecadiene-monoepoxide to the racemic (1S,4S,9R) - cis-decahydronaphthalenediol-(1,4) (>90% yield) was not predictable from the state of the art.

The present invention now for the first time places one in a position to produce one of the six stereoisomeric decahydronaphthalene-1,4-diols in pure form in a technically satisfactory manner. The properties thereof differ importantly from those of the isomeric mixtures. The steric homogeneous structure is e.g. of great advantage in the production of polyesters, polycarbonates, and polyurethanes as well as in the production of biologically active compounds. Cis-, trans-cyclodecadiene-(1,5) is obtainable in good yield according to G. Wilke and his coworkers (Angew. Chem. 75, 18 (1963)) by cyclizing 2 moles of butadiene and 1 mole of ethylene. The epoxidization is carried out in known manner by means of organic peroxide compounds such as performic acid, peracetic acid, perbenzoic acid and others. The epoxidation may be carried out at from about −10 to +60° C. In this way a high yield of the monoepoxide is selectively produced, which according to the infra red spectrum has the constitution of trans-1,2-epoxy-cis-cyclododecene-(5).

Surprisingly the hydrolysis of the monoepoxide of the cis-, trans-cyclodecadiene-(1,5) gives the racemic (1S,4S,9R)-cis-decahydronaphthalenediol-(1,4) with a high degree of selectivity. The hydrolysis can be carried out under the usual conditions e.g. by heating with water in the presence of catalytically acting substances such as acids, e.g. sulfuric acid, perchloric acid, phosphoric acid, etc., Lewis acids e.g. boron trifluoride, zinc chloride etc., as well as alkaline reacting substances such as sodium hydroxide, calcium hydroxide, potassium hydroxide, sodium hydrogen carbonate etc. The hydrolysis proceeds most simply and with yields above 90% by heating with water, without any addition of catalyst. The hydrolysis preferably is carried out with an excess of water. For instance 1 part by weight of the epoxide is added dropwise to from 1 to 10 parts by weight of boiling water with stirring. The reaction is in general completed in 1–3 hours. The excess water is distilled at normal or reduced pressure, and in so doing small amounts of by-products that are steam distillable are removed. Substantially pure, colorless, crystalline racemic (1S,4S,9R)-cis-decahydronaphthalenediol-(1,4) with a melting point of 145–147° C. and with nearly the theoretical hydroxyl number remains in the reaction vessel. The compound can be further purified by recrystallization from organic solvents such as toluene, xylene, ethylacetate, dioxan and others.

The structure of the diol was established by analysis, by comparison of the melting point with that given by Hückel and Kraus and by comparison of the infra red spectrum with that given by Baumann and Prelog for the optically active form. The infra red spectrum of the optically active form and of the racemic form differ only immaterially (see also W. Hückel and W. Kraus, Chem. Ber. 95, 235 (1962)) while the infrared spectrum of the individual stereometric decahydronaphthalene-1,4-dioles differ widely from each other.

The racemic (1S,4S,9R)-cis-decalindiol-(1,4) made according to the present invention is a valuable material for numerous organic syntheses. It is suitable for the production of products that are useful in the production of synthetic resins such as softness, antistatic agents and emulsifiers and for the synthesis of materials that are useful in the production of textiles and synthetic resin precursors of the type of heat hardenable resins and polyester and epoxy resins. Further it is useful in the production of poly condensation products, e.g. polyesters having fiber forming properties, polycarbonates and polyurethanes which have a steric uniform structure. Due to its high melting point it is a good polymer additive. Thus, e.g. anhydride copolymers, isocyanate copolymers and polyepoxides, with additions of the racemic (1S,4S,9R)-cis-decahydronaphthalenediol-(1,4) can be made into coatings and molded bodies. They are of interest in the field of synthetic pharmaceutical preparations and can be used directly as additions to lubricants.

EXAMPLE 1

(a) Production of the monoepoxide of cis-, trans-cyclodecadiene-(1,5).—545 g. (4 mol) of cis,- trans-cyclodecadiene-(1,5) was dissolved in 1200 ml. of methylene chloride and 675 g. of a 54% aqueous solution of peracetic acid (4.8 mol of peracetic acid) was added dropwise at 0° C. with stirring over a period of 1 hour. After 3 hours the per acid was consumed. The organic phase was separated, washed to neutrality with dilute aqueous solution of sodium hydroxide, dried over sodium sulfate, freed of solvent by distillation thereof and then fractionally distilled under partial vacuum. In addition to a forerunning and a residue there was produced 486 g. (80%) of the desired monoepoxide; B.P.$_{11}$:99–101° C., $n_D^{20}$: 1.4937, analysis:

Formula $C_{10}H_{16}O$

|  | C | H | O | Iodine Number | Molecular Weight |
|---|---|---|---|---|---|
| Calc | 78.89 | 10.60 | 10.51 | 166.7 | 152.2 |
| Found | 78.97 | 10.61 | 10.39 | 167 | 154 |

(b) Hydrolysis of the monoepoxide.—250 parts by weight of water was heated to boiling. In the course of 1 hour 50 parts by weight of cyclodecadiene-monoepoxide was added dropwise with stirring and the resulting mixture held for 2 more hours at 100° C. Then the water was distilled first at atmospheric pressure and then under partial vacuum produced by a water jet aspirator. 2 parts by weight of an oily by-product passed over with the water. After the drying of the crystalline distillation residue 52 parts by weight (93%) of racemic (1S,4S,9R)-cis-decahydronaphthalenediol-(1,4) was recovered. It has a melting point of 145–147° C. which was increased to 157° C. by recrystallization from toluene. Analysis:

Formula $C_{10}H_{18}O_2$

|  | C | H | O | Iodine Number | OH Number |
|---|---|---|---|---|---|
| Calc | 70.55 | 10.65 | 18.80 | 0.0 | 659 |
| Found | 70.63 | 10.69 | 18.76 | 0.0 | 657 |

We claim:
1. Process for the production of racemic (1S,4S,9R) (1R,4R,9S) - cis-decahydronaphthalenediol-(1,4) which comprises epoxidizing cis-trans-cyclodecadiene-(1,5) by treatment with an organic peroxy compound at a temperature of from −10 to +60° C. and heating the resulting cyclodiene-monoepoxide with water whereby hydrolysis and rearrangement are effected.
2. Process defined in claim 1, in which the cyclodiene-monoepoxide is heated with at least one part by weight of water based on the weight of the epoxide.
3. Process as defined in claim 1, in which the heating of the cyclodiene-monoepoxide with water is effected in the presence of a catalytic agent selected from the group consisting of sulfuric acid, perchloric acid, phosphoric acid, and boron trifluoride and zinc chloride.
4. Process as defined in claim 1, in which the heating of the cyclodiene-monoepoxide with water is effected in the presence of a catalytic agent selected from the group consisting of sodium hydroxide, calcium hydroxide, potassium hydroxide and sodium hydrogen carbonate.

References Cited

UNITED STATES PATENTS 2,514,365  7/1950  Bell.

OTHER REFERENCES

E. V. Tamelen et al., J. Am. Chem. Soc., The Biogenetically Patterned in Vitro Oxidation-Cyclization of Farnesyl Acetate, 85, 3295–6 (1963).

Hine, Physical Organic Chemistry, McGraw-Hill Book Co. Inc., New York (1956), pp. 50, 53.

LEON ZITVER, Primary Examiner

M. W. GLYNN, Assistant Examiner

U.S. Cl. X.R.

260—348.5